C. W. Sherwood,
Book-Support.

No. 111,577. Patented Feb. 7, 1871.

WITNESSES:
L. L. Bond
E. A. West

Calvin W. Sherwood, INVENTOR.

United States Patent Office.

CALVIN W. SHERWOOD, OF CHICAGO, ILLINOIS.

Letters Patent No. 111,577, dated February 7, 1871.

IMPROVEMENT IN PORTABLE BOOK-HOLDERS.

The Schedule referred to in these Letters Patent and making part of the same.

I, CALVIN W. SHERWOOD, of the city of Chicago, in the county of Cook and State of Illinois, have invented certain new and useful Improvements in Book-Carriers, of which the following is a full description, reference being had to the accompanying drawing making a part of this specification, in which—

Figure 1:
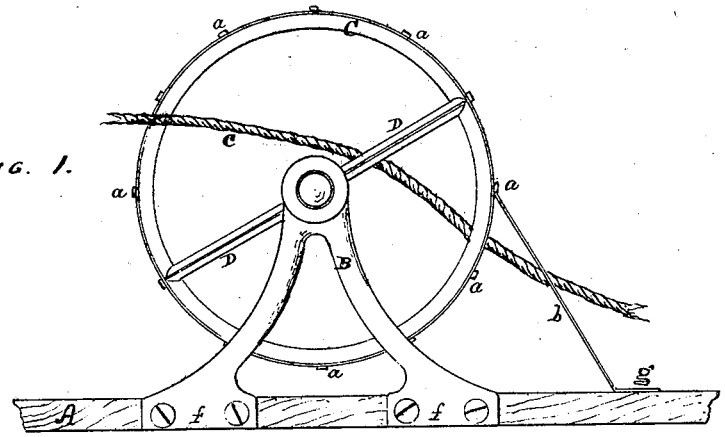
Figure 2:
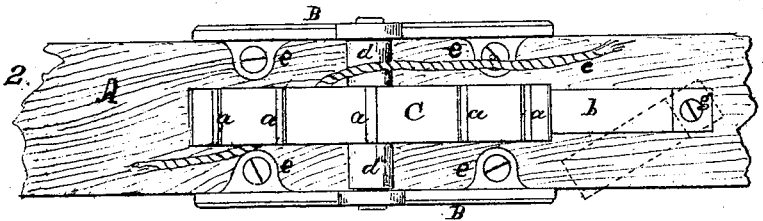
Figure 3:
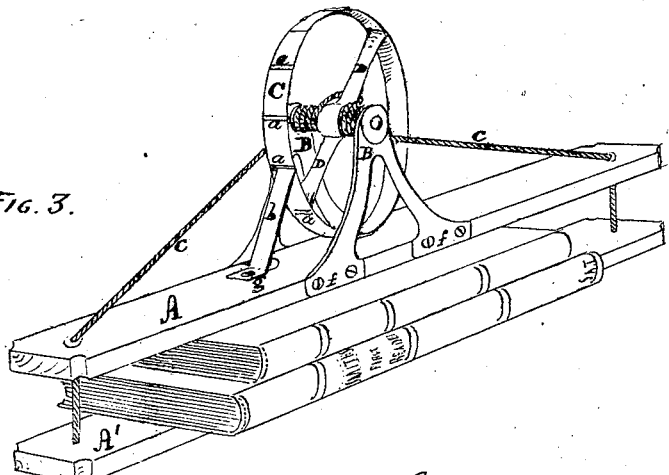

Figure 1 is a side view.
Figure 2, a top view.
Figure 3, a persepective.

My invention consists in providing a book-carrier with a wheel-handle, so constructed, applied, and arranged that it is adapted to be used for the further purpose of tightening the cord of the carrier.

In the drawing—

A A' represent the upper and lower bars of the carrier, between which the books are to be placed, about which there is nothing peculiar.

B B are standards, which are secured to the upper bar A, one on each side. That the standards may be strong and securely fastened to the bar A, I make them, as shown in the drawing, with two legs, and on the inside of each leg provide a flange, $e$, so that the standards can be secured to A at the points $f$ and $e$.

Near the top of each standard is a hole, which serves as a bearing for the axle $d$.

C is the wheel-handle, having an axle, $d$, and a sufficient number of bars, D, connecting the axle $d$ with the rim C. This rim is provided on the periphery with any suitable number of projections $a$ parallel with the axle.

$b$ is a pawl loosely attached to the bar A at $g$, so that it can be turned away from the wheel C, as shown by dotted lines in fig. 2.

$c$ is a cord passing through the bars A A', in the usual manner. This cord passes through the wheel C from one side to the other, as seen in figs. 1 and 2, so that when the wheel C is turned around the cord will be caught by the bar D, and be wound upon the axle $d$ upon each side of the bars D.

When, by turning the wheel C, the requisite strain upon the cord $c$ has been produced, the wheel will be held in place and be prevented from turning back by the pawl or stop $b$ coming in contact with some one of the projections $a$, and the same can be easily released by turning the pawl $b$ away from the rotating handle C.

The wheel C serves the purpose of a handle for the carrier in whatever position the same may be.

Instead of projections $a$ the wheel may be provided with notches to receive the end of the pawl.

If the cord $c$ should break it can be readily readjusted, it only being necessary to pass the same through the wheel-handle as above described and tie the two ends together.

The wheel C and standards B may be cast from any suitable metal.

What I claim as new is—

The rotating handle C, standards B, and pawl $b$, in combination with the bars A A' and cord $c$, substantially as specified.

CALVIN W. SHERWOOD.

Witnesses:
L. L. BOND,
E. A. WEST.